US008473579B2

(12) United States Patent
Connor et al.

(10) Patent No.: US 8,473,579 B2
(45) Date of Patent: *Jun. 25, 2013

(54) DATA RECEPTION MANAGEMENT APPARATUS, SYSTEMS, AND METHODS

(75) Inventors: Patrick L. Connor, Portland, OR (US); Linden Minnick, Hillsboro, OR (US); Lucas M. Jenison, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/468,151

(22) Filed: May 10, 2012

(65) Prior Publication Data

US 2012/0226765 A1    Sep. 6, 2012

Related U.S. Application Data

(63) Continuation of application No. 10/183,185, filed on Jun. 25, 2002, now Pat. No. 8,190,765.

(51) Int. Cl.
*G06F 15/16* (2006.01)
*G06F 15/173* (2006.01)

(52) U.S. Cl.
USPC ............................ 709/217; 709/224; 709/226

(58) Field of Classification Search
USPC .......................................... 709/217, 224, 226
See application file for complete search history.

(56) References Cited

U.S. PATENT DOCUMENTS

| | | | | |
|---|---|---|---|---|
| 5,303,302 A | * | 4/1994 | Burrows | 713/161 |
| 5,872,920 A | * | 2/1999 | Hausman et al. | 709/250 |
| 5,918,225 A | * | 6/1999 | White et al. | 1/1 |
| 5,924,092 A | * | 7/1999 | Johnson | 1/1 |
| 6,229,813 B1 | * | 5/2001 | Buchko et al. | 370/412 |
| 6,366,947 B1 | | 4/2002 | Kavner | |
| 6,378,049 B1 | * | 4/2002 | Stracovsky et al. | 711/147 |
| 6,490,251 B2 | | 12/2002 | Yin et al. | |
| 6,704,316 B1 | * | 3/2004 | He | 370/397 |
| 6,829,224 B1 | | 12/2004 | Goldman et al. | |
| 6,914,607 B2 | | 7/2005 | Walls et al. | |
| 7,243,108 B1 | * | 7/2007 | Jas | 1/1 |
| 7,539,849 B1 | * | 5/2009 | Shavit et al. | 712/202 |
| 8,190,765 B2 | | 5/2012 | Connor et al. | |
| 2003/0179703 A1 | * | 9/2003 | Levy et al. | 370/230 |
| 2007/0169033 A1 | * | 7/2007 | Metzgen | 717/140 |
| 2007/0183421 A1 | * | 8/2007 | Terrell et al. | 370/389 |

OTHER PUBLICATIONS

"U.S. Appl. No. 10/183,185, Decision on Appeals mailed Dec. 19, 2011", 9 pgs.
"U.S. Appl. No. 10/183,185, Final Office Action mailed Aug. 9, 2006", 17 pgs.
"U.S. Appl. No. 10/183,185, Non-Final Office Action mailed Jan. 27, 2006", 14 pgs.

(Continued)

*Primary Examiner* — Karen Tang
(74) *Attorney, Agent, or Firm* — Schwegman, Lundberg & Woesser, P.A.

(57) ABSTRACT

Apparatus, systems, and methods to manage networks may operate to receive a packet into an element of an array contained in a memory while a low resource state exists, and to truncate the array at the element responsive to at least one of an indication that the array is full, or an indication that no more packets are available to be received after receiving at least the packet. The receiving and the truncating may be executed by a processor. Additional apparatus, systems, and methods are disclosed.

20 Claims, 3 Drawing Sheets

OTHER PUBLICATIONS

"U.S. Appl. No. 10/183,185, Non-Final Office Action mailed Jun. 2, 2006", 14 pgs.

"U.S. Appl. No. 10/183,185, Non-Final Office Action mailed Sep. 21, 2005", 14 pgs.

"U.S. Appl. No. 10/183,185, Notice of Allowance mailed Feb. 1, 2012", 14 pgs.

"U.S. Appl. No. 10/183,185, Response filed Nov. 7, 2005 Non-Final Office Action mailed Sep. 21, 2005", 14 pgs.

"U.S. Appl. No. 10/183,185, Response filed Mar. 24, 2006 Non-Final Office Action mailed Jan. 27, 2006", 11 pgs.

"U.S. Appl. No. 10/183,185, Response filed Jul. 28, 2006 Non-Final Office Action mailed Jun. 2, 2006", 12 pgs.

* cited by examiner

| | | EXAMPLE 1 | | | EXAMPLE 2 | | |
|---|---|---|---|---|---|---|---|
| TIME | RESOURCES RETURNED | RETURNED RESOURCES | RESOURCES AVAILABLE | NOTES | RETURNED RESOURCES | RESOURCES AVAILABLE | NOTES |
| 1 | 0 | 0 | 22 | ADD A0 | 0 | 22 | ADD A0 |
| 2 | 0 | 0 | 21 | ADD A1 | 0 | 21 | ADD A1 |
| 3 | 0 | 0 | 20 | ADD A2 | 0 | 20 | ADD A2 |
| 4 | 0 | 0 | 19 | ADD A3 | 0 | 19 | ADD A3 |
| 5 | 0 | 0 | 18 | ADD A4 | 0 | 18 | ADD A4 |
| 6 | 0 | 0 | 17 | ADD A5 | 0 | 17 | ADD A5 |
| 7 | 8 | 0 | 16 | ADD A6 | 0 | 24 | ADD A6 |
| 8 | 0 | 0 | 18 | ADD A7 | 0 | 23 | ADD A7 |
| 9 | 0 | 0 | 18 | COMPUTE I, INDICATE A0–A6 | 0 | 23 | INDICATE ARRAY |
| 10 | ... | 0 | 18 | COPY A6 | ... | ... | DONE |
| 11 | | 0 | 18 | | | | |
| 12 | | 0 | 18 | | | | |
| 13 | | 1 | 19 | COMPUTE I, INDICATE A7 AS B0 | | | |
| 14 | | 0 | 19 | COPY B0 | | | |
| 15 | | 0 | 19 | | | | |
| 16 | | 0 | 19 | | | | |
| 17 | | 1 | 20 | DONE | | | |
| 18 | | ... | ... | ... | | | |
| 19 | | | | | | | |
| | 331 | 343 | 349 | 357 / 337 | 351 | 361 | 339 |

*Fig.3*

DATA RECEPTION MANAGEMENT APPARATUS, SYSTEMS, AND METHODS

RELATED APPLICATIONS

This application is a continuation of U.S. patent application Ser. No. 10/183,185, filed on Jun. 25, 2002, now issued as U.S. Pat. No. 8,190,765, which is incorporated herein by reference in its entirety, This application is related to the following co-pending applications, both of which are commonly assigned to the assignee of the present invention:

(1) Ser. No. 09/814,362, titled "Reducing Memory Copies by a Network Controller", filed on Mar. 21, 2002, now abandoned, and (2) Ser. No. 09/881,302, titled "Method and Apparatus to Manage Resources For a Multi-Threaded Device Driver", filed on Jun. 13, 2001, now abandoned.

TECHNICAL FIELD

This relates generally to apparatus, systems, and methods for managing resources related to the transfer of data.

BACKGROUND INFORMATION

A computer network is a system of hardware and software that allows two or more computers to communicate with each other. Networks are of several different kinds For example, local area networks ("LANs") connect computers within a work-group or department. There are campus networks which extend to multiple buildings on a campus, as well as metropolitan area networks, ("MANs") which span a city or metropolitan area. There are also wide area networks ("WANs") that connect nodes in different cities, states and countries.

In a communications network, a network controller typically manages transmission and reception of data packets by transferring data between the network and a shared memory subsystem. The shared memory is used by several different devices including the system processor, input/output (I/O) devices, and disks, as well as the network controller. The network controller may access the shared memory using a shared system bus.

Packet descriptors, or an analogous data structure, are typically used by the network controller to describe the specific information about each data packet, e.g. type, length, and size. The packet descriptors are typically located in the shared memory subsystem, along with the data packets. To transmit or receive a data packet, the network controller typically accesses the packet descriptor for the packet to be communicated, transfers the packet data to or from the shared memory, and then updates the packet descriptor with the new status.

Due to the nature of computer networks, packets are usually delivered to the network operating system in the order they are received. For high-speed networks, several packets may be received before a software driver is called to process the packets. In these circumstances, the received packets may reside in an array maintained in the shared memory until the operating system copies the packets to the host memory. However, if the network controller is running low on resources while processing the array of packets, it may free up resources by copying packets into an operating system buffer. While copying packets into buffers generally operates to release resources, it also introduces the additional task of copying the data into the packet handling process, increasing the load on the memory subsystem. Because packets are typically delivered in the order received, additional packets are usually copied into operating system buffers even after more resources have been made available.

DETAILED DESCRIPTION OF THE EMBODIMENTS

In the following detailed description of various embodiments of the invention, reference is made to the accompanying drawings which form a part hereof, and in which are shown by way of illustration, and not of limitation, specific embodiments in which the invention may be practiced. In the drawings, like numerals describe substantially similar components throughout the several views.

The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments of the invention is defined only by the appended claims, along with the full range of equivalents to which such claims are entitled.

The device driver model for network controllers in the Windows® 2000 Operating System (OS) is called the Network Driver Interface Specification (NDIS). Further information regarding Version 5.0 of the NDIS can currently be found at http://www-microsoft-com/hwdev/tech/network/ndis5-asp (to avoid inadvertent hyperlinks the periods in the preceding URL have been replaced by dashes). This specification provides a common interface for network drivers under the OS, and can be abstracted from many different protocol stacks and applications. Therefore, if a driver is NDIS-compliant, it can interoperate with a protocol or network file system that is also NDIS-compliant.

In order to manage the supply of resources, a memory may be used to record the number of resources available after a packet is received into an element of the shared memory array. For example, assuming use of the OS and NDIS, when a packet indicates a low resource state, the NDIS or the protocol stack, such as a stack including the Transmission Control Protocol/Internet Protocol (TCP/IP), may copy the packet to a separate buffer before processing it. This allows the device driver to immediately regain control of the buffer and other associated data reception resources and prevents the device driver from running completely out of such resources. However, one potential drawback is that the data copy from the device driver's buffer to the protocol stack's buffer increases processor utilization and can reduce overall throughput.

Under the OS, NDIS device drivers may be deserialized (multi-threaded). This allows a device driver to be running on multiple processors simultaneously, such that on one processor the driver can indicate received packets, and on another processor the driver may return resources from previously indicated packets which have already been processed by the protocol stack.

In high-speed networks, such as gigabit Ethernet (see IEEE 802.3, 2000 Edition, IEEE Standard for Information Technology—Telecommunications and information exchange between systems—local and metropolitan area networks—specific requirements—Part 3: Carrier Sense Multiple Access with Collision Detection Access Method and Physical Layer Specifications, currently published at http://standards-ieee.org/getieee802/)(to avoid inadvertent hyperlinks the period in the preceding URL has been replaced by a dash), an end-station receiving node, such as a PC or a server, can be inundated with a high rate of incoming data. Flow control protocols attempt to manage the situation, but high-speed controllers sometimes still run low on resources during such high packet rate bursts.

Figure 1:
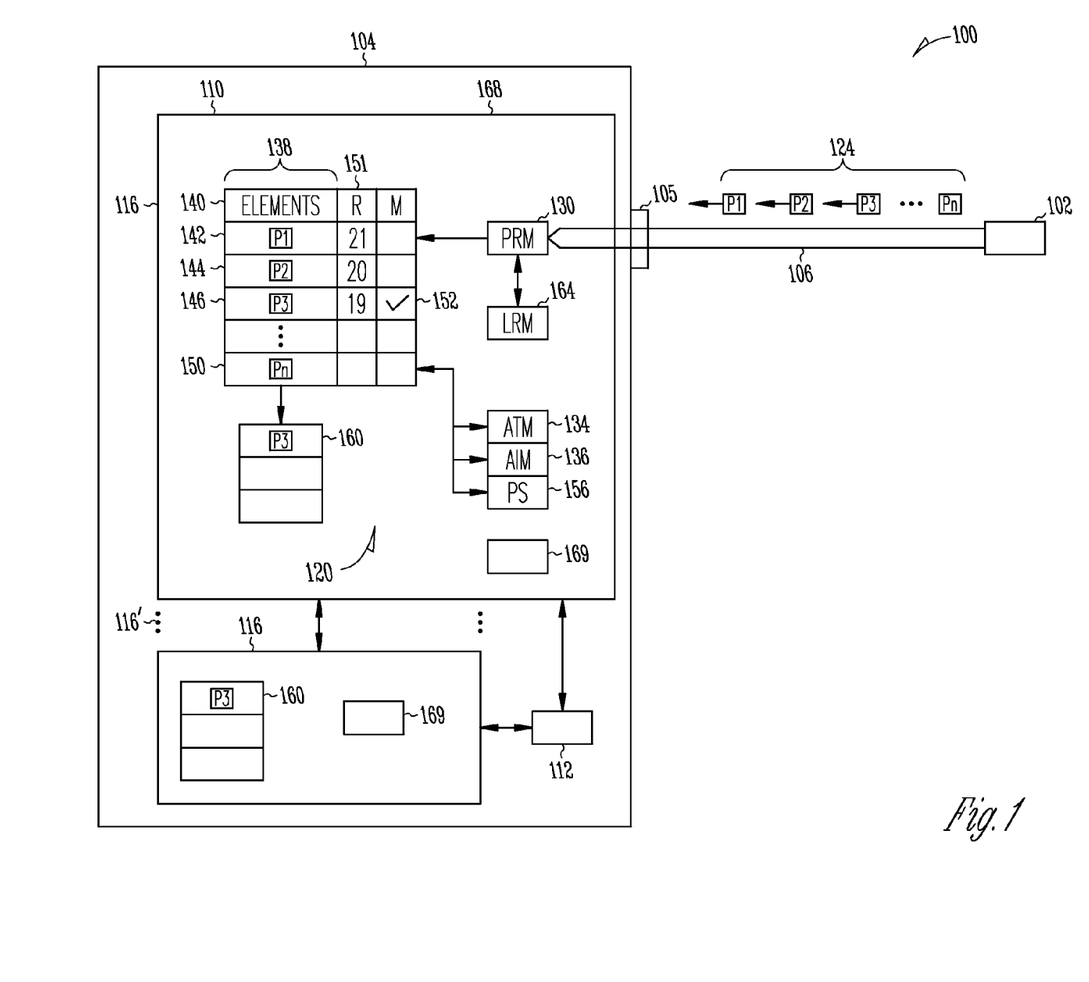
FIG. 1 is a block diagram of an apparatus, an article including a machine-accessible medium, and a system according to various embodiments of the invention.

FIG. 1 is a block diagram of an apparatus, an article including a machine-accessible medium, and a system 100 according to various embodiments of the invention. The system 100 may include a sending node 102 and a receiving node 104. The sending node 102 may be coupled to the receiving node 104 by way of a wireless interface 105 and/or a communications medium 106, including a network, such as a LAN, MAN, WAN, a wireless network, or a global telecommunications network (e.g., the Internet). The receiving node 104 may be a computer or other data processing apparatus, and it may include a network controller 110 and/or a processor 112 coupled to one or more memories 116. The network controller 110 and/or one of the memories 116 may, in turn, include an apparatus 120 to manage the reception of data, including data packets 124. In one embodiment, the apparatus 120 may include a packet-receiving module 130, an array truncation module 134, and an array indication module 136.

The packet-receiving module 130 is capable of receiving one or more packets 124 at a time. Each packet 124 may be received into an element 138 of an array 140, such that a first packet P1 may be received into a first array element 142, a second packet P2 may be received into a second array element 144, and a third packet P3 may be received into a third array element 146. This process continues until either the array is full (e.g., packet Pn is received into the last array element 150), or there are no more packets to be received (e.g., the transmission of packets is completed after packet Pn is sent by the sending node 102). As the packets P1 . . . Pn are received, resources within the receiving node 104 and/or network controller 110 are used by the reception process, and by other data processing tasks which may occur at substantially the same time. The number of resource elements may be monitored and/or stored in the array 140 or in some other location. At some point, a low resource state may exist (e.g., when the number of resources falls below a threshold), such that unmanaged data reception may consume all of the remaining resources.

Related Applications (1) and (2) have devised methods to deal with this situation, with varying degrees of success. For example, regarding Related Application (1), one method notes when a low resource state occurs and continues constructing the received array of packet data. If the low resource state no longer exists when the array is fully constructed, then the array may be indicated with a normal status for each packet in the array. However, if the low resource state still exists at the time the array is fully constructed, then the array may be indicated including the low resource state. A potential advantage to such a method is that it can indicate an array which requires no data copies even after a low resource state has been encountered, as long as the low resource state no longer exists when the array is fully constructed. Otherwise, the array may be indicated with several packets that must be copied. This is an optimistic method, which continues to build the array in the hope that resources will not be low when array construction is complete.

Regarding Related Application (2), another method operates to truncate the array at the time a low resource state is encountered, immediately indicating the array. This limits the number of copied packets to one, and it allows time during the copying task for the low resource state to be alleviated. However, once a low resource state is encountered, the array will be indicated with at least one packet, which can be copied even if the low resource state would otherwise have been alleviated by the time a full array was constructed. This is a pessimistic method, limiting the number of copies to one per array, and assuming resources will never be recovered before construction is complete An improved solution, making use of an embodiment of the invention, involves determining a truncation point 152 in the array 140 if a low resource state persists after array construction. Making this determination after the array construction is complete (i.e., all array elements have received packets, or no more packets are available for reception) allows accounting for a partial return of resources.

A determination of a truncation point may, for example, operate on three factors: the low resource threshold, T; the length L of the array; and the number of resources remaining, R. Using these variables, a zero-based index, I, of the truncation point may be determined with the following formula:

$$I=L-(T-R)$$

For example, assume that the array 140 used to receive data has 10 elements (L=10, with elements ranging in number from 0, 1, . . . , 8, 9), that the low resource threshold is selected to be 20 resources (T=20), and that 18 resources remain (R=18) at the end of array construction (e.g., after element 9 receives a packet P8). The result is that the last two array elements (i.e., T−R=2, or elements 8 and 9) are found to be in a low resource state. The zero-based index of the beginning of the low resource state may then be determined as:

$$I=10-(20-18)=8$$

Of course, any number of other methods may be used to determine a truncation point, or an index I, such as by designating the position of the first low resource packet, or using other formulae which take into account the low resource threshold, T; the length L of the array; and the number of resources remaining, R.

After determining the zero-based index I, element I of the array 140 is marked, or an indication is made that the array 140 is in the low resource state. The array 140 may be truncated at element I, which, according to this exemplary embodiment, is typically the location 152 where the low resource state was first manifested. However, array elements subsequent to I (i.e., elements I+1, 1+2, etc.) are not discarded; rather, element I+1 is set to be the zero index element of the new array (i.e., the first element, or element 0), element I+2 is set to be the next element of the new array, and so forth.

Thus, the array truncation module 134 may be used to truncate the array 140 at the determined element location 152 when there is an indication that the array 140 is full or when there is an indication that no more packets 124 are available to be received (i.e., after at least the packet Pn has been received into the array by the packet-receiving module 130). An array indication module 136, included in the apparatus 120 and coupled to the array 140, may be used to indicate the array 140 responsive to the array truncation module 134 truncating the array 140.

The apparatus 120 may also include a protocol stack 156, such as a protocol stack which includes the transport control protocol/Internet protocol (TCP/IP). The protocol stack 156 may be used to copy the ultimate or last packet in the indicated array (e.g. packet P3) to a buffer 160. The buffer may reside in the same memory 116 as the array 140 and/or the packet-receiving module 130. A low resource module 164, such as a driver module (including driver modules operating according to the NDIS), may also be included in the apparatus 120 and coupled to the packet-receiving module 130. The low resource module 164 may be used to indicate the existence of a low resource state.

The receiving node 104 may include one or more memories 116, each including one or more elements of the apparatus 120, such as the packet-receiving module 130, the array truncation module 134, the array indication module 136, the array 140, the protocol stack 156, the buffer 160, and the low resource module 164.

The memories 116 may be contiguous, included within a single larger memory 116', or discrete, existing as part of other components or devices physically separated from the receiving node 104.

The system 100, the sending node 102, the receiving node 104, the medium 106, the network controller 110, the processor 112, the memories 116, 116', the apparatus 120; the packet-receiving module 130, the array truncation module 134, the array indication module 136, the array 140, the protocol stack 156, and the buffer 160 may all be characterized as "modules" herein. Such modules may include hardware circuitry, and/or a processor and/or memory circuits, software program modules, and/or firmware, and combinations thereof, as desired by the architect of the system 100 and the apparatus 120, and as appropriate for particular implementations of various embodiments of the invention.

One of ordinary skill in the art will understand that the apparatus and systems of the present invention can be used in applications other than for computers, and other than for systems which include networked computers, and thus, the invention is not to be so limited. The illustrations of a system 100 and an apparatus 120 are intended to provide a general understanding of the structure of the present invention, and they are not intended to serve as a complete description of all the elements and features of apparatus and systems that might make use of the structures described herein.

Applications that may include the novel apparatus and systems of the present invention include electronic circuitry used in high-speed computers, communication and signal processing circuitry, modems, processor modules, embedded processors, and application-specific modules, including multilayer, multi-chip modules. Such apparatus and systems may further be included as sub-components within a variety of electronic systems, such as televisions, cellular telephones, personal computers, radios, vehicles, and others.

Figure 2:
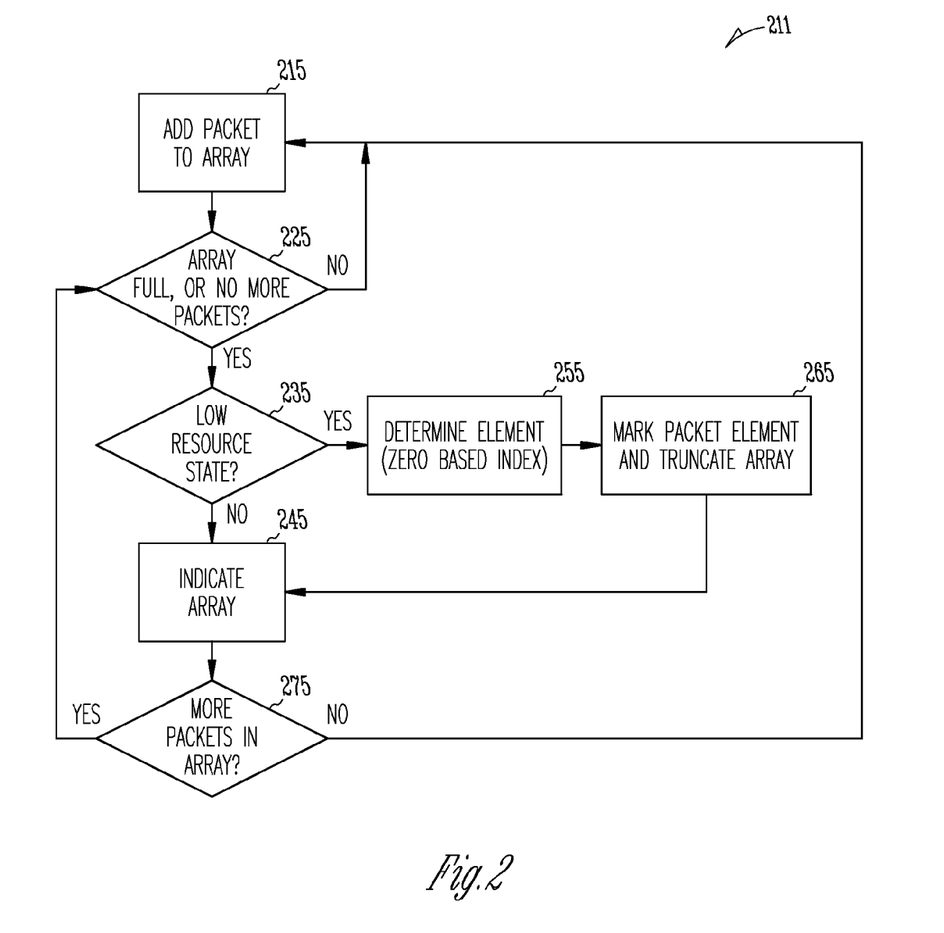
FIG. 2 is a flow chart illustrating a method of managing data reception according to an embodiment of the invention.

FIG. 2 is a flow chart illustrating a method of managing data reception according to an embodiment of the invention. The method 211 may begin by adding a packet to an array, such as by receiving the packet into an element of the array at block 215. A low resource state may or may not exist when the packet is received into an element of the array.

The method 211 may continue with determining that the array is full and/or determining that no more packets are available to be received at block 225. If the array is not yet full, and there are more packets to be received (i.e. data packet Pn has not yet been received), then the method 211 may continue with receiving another packet into an element of the array at block 215.

If the array is full, or no more packets are available to be received, the method 211 may continue with indicating the array at block 245 if resources are not low at block 235. If resources are low at block 235, the method 211 may continue, for example, with determining which element of the array was received when a low resource state first existed during reception of packets into the array elements (at block 255).

As described previously, the element of the array which received a packet during the existence of a low resource state may be determined by calculating a zero-based index. This index may be associated with the packet received into the element of the array by subtracting the difference between a low resource threshold associated with the array, and a number of resources remaining when the packet was received into the element of the array.

The method 211 may then continue at block 265 with marking the determined low resource element, and then truncating the array at the determined low resource element. Of course, truncation does not occur until after the array is full, or no more packets are available to be received (i.e., the last packet is received). After the array is truncated at block 265, the array may then be indicated at block 245, and, if necessary, the ultimate or last element in the truncated array may be copied to a buffer.

The method 211 may continue with determining if another packet remains in the array at block 275. If at least one other element remains after truncation, the remaining element (or elements) following the marked and truncated array element may be associated with the first and subsequent elements of a packet-receiving array, either a new array or the previous array. If the array receiving the remaining elements is not full after association occurs, and there are more packets to be received, as determined at block 225, then the method 211 may continue with receiving another (new) packet into another element (subsequent to the newly-associated remaining elements) of the packet-receiving array at block 215. Otherwise, the method 211 may continue with block 235.

Thus, referring back to FIG. 1, it is now easily understood that another embodiment of the invention may include an article, such as a computer, a memory system, a magnetic or optical disk, some other storage device, and/or any type of electronic device or system, for example network controller 110, comprising a machine-accessible medium such as a memory 116 (e.g., a memory including an electrical, optical, or electromagnetic conductor) having associated data 169 (e.g. computer program instructions), which when accessed, results in a machine performing such actions as receiving a packet into an element of an array (whether a low resource state exists or not), marking an element of the array received during a low resource state, and truncating the array at the marked element after the array is full or no more packets are available to be received. Other actions may include determining the element of the array received during a low resource state by calculating a zero-based index, such as by subtracting the difference between a low resource threshold associated with the array, and the number of resources remaining when the packet was received into the element of the array, and then indicating the array.

Further, accessing the data 169 may result in the machine performing actions such as associating the first element of the array with another packet received into the array, the other packet having been originally received into an element following the marked element (i.e., the element received during the existence of a low resource state).

Figure 3:
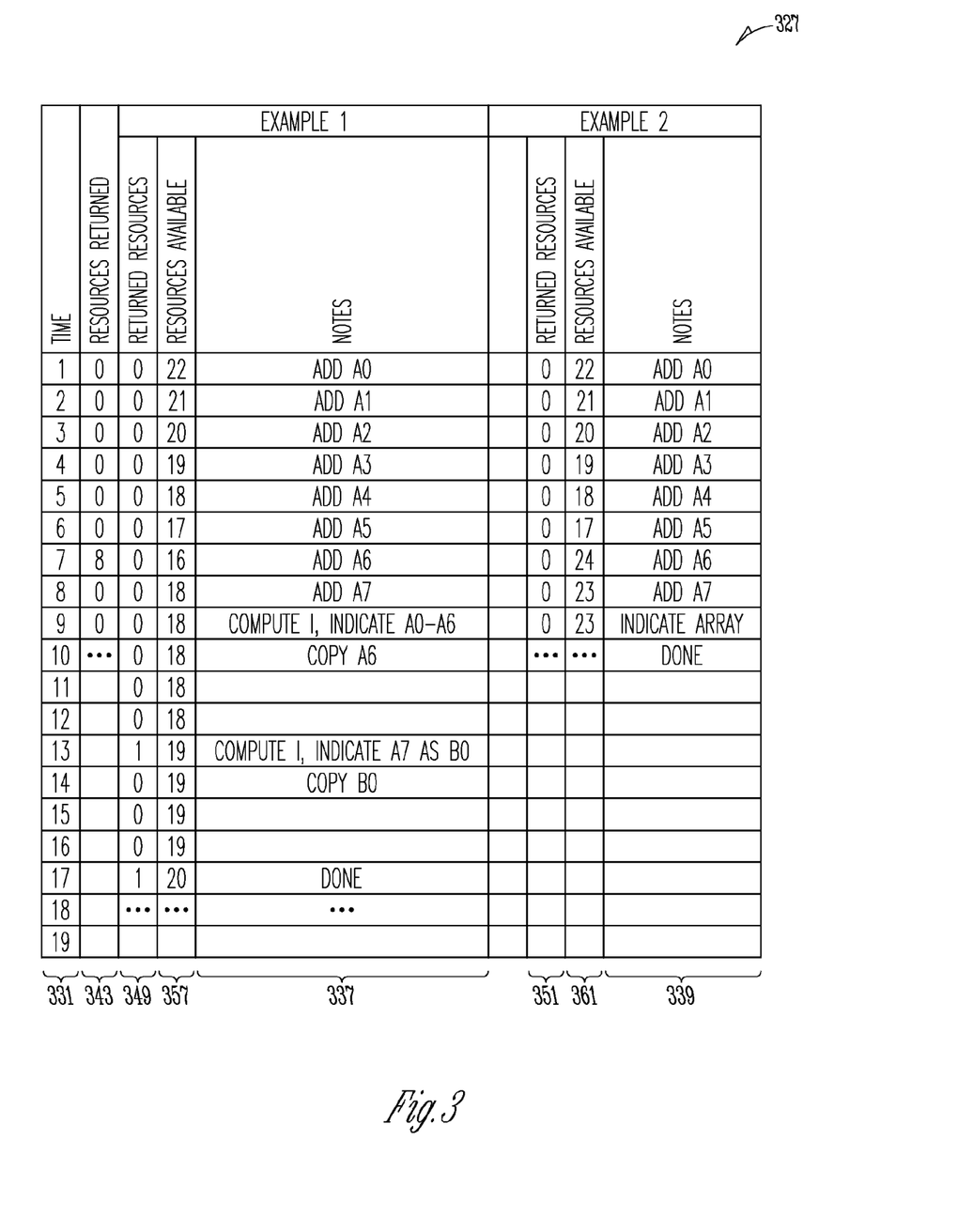
FIG. 3 is a table illustrating two examples of data reception into an array according to an embodiment of the invention.

FIG. 3 is a table 327 illustrating two examples of data reception into an array according to an embodiment of the invention. The table 327 includes a standardized time index column 331. During each time interval, several events can occur: a packet can be added to an array, an array may be indicated, or a packet may be copied. Adding a packet to an array and indicating arrays are relatively short processes compared to the time to copy a packet. Since it is difficult to quantify the amount of time required to copy a packet, considering the length of the packet, memory speed, cache status, etc., it is assumed that three time index units are necessary to copy a single packet for Examples 1 and 2.

The table 327 also includes a column 343 reflecting the count of resources being returned on other processors. It is assumed that actions on the processor used to construct and indicate arrays will not affect the rate of resources being returned.

For each example (i.e., Example 1 and Example 2), there are three columns. The first column 349, 351 is the number of resources that are returned on a single processor executing a method of receiving packetized data according to an embodiment of the invention. The second column 357, 361 is the number of resources available as each event occurs. The Notes columns 337, 339 record which event is occurring during a particular indexed time unit.

Assume the low resource threshold is selected to be 20 elements, and that Examples 1 and 2 each include receiving packets into an array with sufficient resources to accommodate 22 packets. Also assume that each exemplary array "A" will be constructed by receiving 8 packets, after which the arrays will be indicated to the protocol stack.

Thus, considering Example 1, eight packets are received into array elements A0 . . . A7. During indexed time period 8, therefore, the last packet is added to the array. Noting that even though 8 resources were returned by some processes during indexed time unit 7, a low resource state still existed during the reception of the last five packets (i.e., the packets received into elements A3 . . . A7).

Computing the zero-based index I=6, it is determined that array element A6 should be marked for copying, and the array is truncated at element A6. The array "A" is then indicated to the protocol stack, and element A6 may be copied to a buffer.

Since there are still array elements remaining after truncation, the remaining element A7 is associated with the first element of a receiving array, perhaps a new array "B", as element B0. Since no more elements are available to be received and a low resource state still exists, the zero-based index is determined to be I=0, array element B0 is marked for copying, the array "B" is truncated at element B0, and array "B" is indicated to the protocol stack. Array element B0 is then copied to a buffer.

For Example 2, the pattern of returned resources by other processes is different. In this case, the return of 8 resources during indexed time unit 7 results in immediately eliminating the existence of a low resource state. Thus, when the array "A" is constructed with 8 packets, none of the packets is copied after the array is indicated during indexed time unit 9. Thus, if resources have been partially recovered, sufficient to alleviate a low resource state which arises during the reception of some packets, some embodiments of the invention will obviate the need for making any buffer copies. Of course, copies can be made when resources are so low as to make it necessary.

In each of the examples shown in FIG. 3, the rate at which resources are being returned is unchanged by the indication algorithm being used (because the algorithm is being executed on another processor). However, such an assumption may not always be true. Those skilled in the art will realize that making copies detracts from the overall ability of a system to process packets and return resources when they are needed most. Because some embodiments of the invention reduce the amount of copies that are made, more system bandwidth may be available for processing packetized data which has already been received. Therefore, associated resources may be returned sooner, which in turn may allow the overall data processing system to alleviate a low resource condition and return to normal operation more quickly.

Although specific embodiments have been illustrated and described herein, those of ordinary skill in the art will appreciate that any arrangement which is calculated to achieve the same purpose may be substituted for the specific embodiments shown. This disclosure is intended to cover any and all adaptations or variations of various embodiments of the present invention. It is to be understood that the above description has been made in an illustrative fashion, and not a restrictive one. Combinations of the above embodiments, and other embodiments not specifically described herein will be apparent to those of skill in the art upon reviewing the above description. The scope of various embodiments of the invention includes any other applications in which the above structures and methods are used. For example, operating systems, interface specifications (including driver interface specifications), drivers, and protocols other than those explicitly specified herein may be used to construct further embodiments of the invention. Therefore, the scope of various embodiments of the invention should be determined with reference to the appended claims, along with the full range of equivalents to which such claims are entitled.

It is emphasized that the Abstract is provided to comply with 37 C.F.R.

§ 1.72(b) requiring an Abstract that will allow the reader to quickly ascertain the nature of the technical disclosure. It is submitted with the understanding that it will not be used to interpret or limit the scope or meaning of the claims.

In the foregoing Detailed Description of Embodiments of the Invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description of Embodiments of the Invention, with each claim standing on its own as a separate preferred embodiment.

What is claimed is:

1. An apparatus, comprising:

memory having a plurality of memory elements to store packets of data;

a processor, coupled to the memory, to receive packets of data and to provide the received packets of data to the memory elements to construct an array; and an array truncation module, coupled to the processor, to truncate the array at one of the plurality of memory elements, responsive to an indication of completion of construction of the array upon determination of one of the array being full or that no more packets are available for reception after at least one packet has been received into one of the plurality of memory elements.

2. The apparatus of claim 1,
wherein the memory includes a packet-receiving module.

3. The apparatus of claim 1, wherein the memory further includes an array indication module to indicate the array responsive to an indication that the array truncation module has truncated the array.

4. A receiving node, comprising:
memory having a plurality of memory elements to store packets of data;
a processor, coupled to the memory, to receive packets of data and to provide the received packets of data to the memory elements to construct an array;
a packet-receiving module, coupled to the processor, to receive a packet from a sending node into one of the memory elements of the array responsive to an indication of an existing low resource state;
an array truncation module, coupled to the processor, to truncate the array at one of the plurality of memory elements responsive to an indication of completion of construction of the array upon determination of one of the array being full or that no more packets are available for reception after at least the packet has been received into the one of the plurality of memory elements; and
an array indication module, coupled to the processor, to indicate the array responsive to an indication that the array truncation module has truncated the array.

5. The node of claim 4, further comprising:
a low resource module to store a representation of the low resource state and a representation of a resource state associated with reception of another packet into an additional element of the array.

6. The node of claim 4, wherein the receiving node is capable of receiving the packet from at least one of a wide area network or a local area network.

7. The node of claim 4, wherein the packet-receiving module operates accordance with a network driver interface specification.

8. The node of claim 4, further comprising:
a low resource module coupled to the packet-receiving module, the low resource module to provide the indication of the existing the low resource state.

9. The node of claim 8, wherein the low resource module comprises a desterilized driver module.

10. A method, comprising:
providing memory having a plurality of memory elements to store packets of data
receiving packets of data and providing the received packets of data to the memory elements to construct an array while a low resource state exists; and
truncating the array at one of the plurality of the memory elements determined to be the memory element where the low resource state occurs, the receiving and the truncating to be executed by the processor.

11. The method of claim 10, further comprising:
determining that the array is full or that no more packets are available to be received.

12. The method of claim 10, further comprising:
indicating when the array is full and resources are not low, or when the array is full and no more packets are available to be received.

13. The method of claim 10, wherein receiving the packet into one of the plurality of memory elements occurs in accordance with a network driver interface specification.

14. The method of claim 10, further comprising:
determining when another packet remains in the array after the truncating.

15. The method of claim 10, further comprising:
determining the memory element of the array to truncate the array at by calculating an index.

16. The method of claim 15, further comprising:
calculating the index by subtracting a difference between a low resource threshold associated with the array and a number of resources remaining when the packet was received into the memory element of the array.

17. The method of claim 10, further comprising:
associating a first memory element of the array with another packet included in a next element of the array following the packet received into the memory element of the array.

18. The method of claim 10, further comprising:
determining a truncation location in the array after construction of the array completes.

19. The method of claim 10, further comprising:
terminating construction of the array when the array is full or when no more packets are available for reception.

20. The method of claim 10, further comprising:
indicating the array after the truncating as a truncated array; and
subsequently indicating memory elements included in the truncated array.

* * * * *

UNITED STATES PATENT AND TRADEMARK OFFICE
CERTIFICATE OF CORRECTION

PATENT NO.         : 8,473,579 B2                                              Page 1 of 1
APPLICATION NO.    : 13/468151
DATED              : June 25, 2013
INVENTOR(S)        : Connor et al.

It is certified that error appears in the above-identified patent and that said Letters Patent is hereby corrected as shown below:

In the Claims

In column 9, line 36, in Claim 7, after "operates", insert --in--, therefor In column 9, line 41, in Claim 8, after "existing", delete "the", therefor In column 9, line 43, in Claim 9, delete "desterilized" insert --deserialized--, therefor In column 9, line 46, in Claim 10, delete "data" insert --data;--, therefor Signed and Sealed this
Twenty-third Day of December, 2014

Michelle K. Lee
*Deputy Director of the United States Patent and Trademark Office*